(12) United States Patent
Piatt et al.

(10) Patent No.: US 8,098,800 B2
(45) Date of Patent: *Jan. 17, 2012

(54) METHOD AND APPARATUS FOR BULLETIN BOARD MESSAGING IN A VOICE MAIL SYSTEM

(75) Inventors: Kathy Goode Piatt, Cedar Park, TX (US); Martha Karen Boyd, Austin, TX (US)

(73) Assignee: AT&T Intellecutal Property I, L.P., Atlanta, GA (US)

( * ) Notice: Subject to any disclaimer, the term of this patent is extended or adjusted under 35 U.S.C. 154(b) by 1050 days.

This patent is subject to a terminal disclaimer.

(21) Appl. No.: 11/969,074

(22) Filed: Jan. 3, 2008

(65) Prior Publication Data
US 2008/0123824 A1 May 29, 2008

Related U.S. Application Data

(63) Continuation of application No. 10/946,656, filed on Sep. 22, 2004, now Pat. No. 7,340,044.

(51) Int. Cl.
H04M 1/64 (2006.01)
(52) U.S. Cl. ............... 379/88.23; 370/352; 379/88.13; 379/88.18; 379/88.22; 379/88.25; 379/205.01; 379/207.02; 379/218.01; 455/410; 455/466; 455/564; 703/6; 705/14.4; 709/206
(58) Field of Classification Search ............... 379/88.18, 379/88.22, 88.23, 88.25, 205.01, 52, 88.13, 379/218.01, 207.02; 455/410, 564, 466; 703/6; 709/206; 370/352; 705/14.4
See application file for complete search history.

(56) References Cited

U.S. PATENT DOCUMENTS

| | | | |
|---|---|---|---|
| 4,409,439 A | 10/1983 | Gamble | |
| 5,544,229 A | 8/1996 | Creswell et al. | |
| 5,771,446 A * | 6/1998 | Wilkinson | 455/410 |
| 5,872,779 A * | 2/1999 | Vaudreuil | 370/352 |
| 6,088,435 A * | 7/2000 | Barber et al. | 379/205.01 |
| 6,216,098 B1 * | 4/2001 | Clancey et al. | 703/6 |
| 6,442,243 B1 | 8/2002 | Valco et al. | |
| 6,735,286 B1 * | 5/2004 | Hansen et al. | 379/52 |
| 6,751,299 B1 * | 6/2004 | Brown et al. | 379/88.18 |
| 6,768,999 B2 * | 7/2004 | Prager et al. | 1/1 |
| 6,996,212 B1 * | 2/2006 | Baker et al. | 379/88.22 |
| 7,032,030 B1 | 4/2006 | Codignotto | |
| 7,212,614 B1 * | 5/2007 | Burg et al | 379/88.18 |
| 7,340,044 B2 * | 3/2008 | Piatt et al. | 379/88.23 |
| 7,526,074 B2 * | 4/2009 | Craig | 379/88.23 |
| 7,899,498 B2 * | 3/2011 | Bender et al. | 455/564 |
| 2001/0040954 A1 | 11/2001 | Brachman et al. | |
| 2002/0103867 A1 * | 8/2002 | Schilter | 709/206 |
| 2004/0131081 A1 | 7/2004 | Bharla et al. | |
| 2006/0062361 A1 * | 3/2006 | Piatt et al. | 379/88.23 |
| 2008/0123824 A1 * | 5/2008 | Piatt et al. | 379/88.25 |

* cited by examiner

Primary Examiner — Gerald Gauthier
(74) Attorney, Agent, or Firm — Jackson Walker L.L.P.

(57) ABSTRACT

The present invention provides an option to record messages that can be geared to specific audiences, using PIN-restricted access as needed. The present invention provides a method and apparatus way for subscribers to record a number (more than one) of personalized messages or greetings geared towards specific callers or audiences in a plurality of bulletin boards associated with a single telephone number. The personalized greetings comprise public messages, private messages, public comments and private comments. The method and apparatus of the present invention also ensures customer privacy and increases the level of security by providing an option to PIN-protect the content and access to the content for each of the public and private recorded messages and comments.

12 Claims, 16 Drawing Sheets

METHOD AND APPARATUS FOR BULLETIN BOARD MESSAGING IN A VOICE MAIL SYSTEM

RELATED APPLICATION

This application is a continuation of U.S. patent application Ser. No. 10/946,656, filed Sep. 22, 2004, the contents of which are hereby incorporated in their entirety by reference.

BACKGROUND OF THE INVENTION

1. Field of the Invention

The present invention relates to the field of telecommunications. More particularly, the present invention relates to messaging features provided in a voice mail enabled telephone system.

2. Background Information

Presently, a number of public switched telephone networks (PSTN) and advanced intelligent networks (AINs), interactive voice response systems (IVRs) and voice over Internet protocol (VoIPs) systems enable dynamic interaction between their customers and their respective service accounts. Servers, databases, intelligent peripherals and other external data network elements interface with the PSTN/AIN to process and store information created during routine handling of telephone calls.

For example, U.S. patent application publication 2004/0131081 discloses a communication system that exchanges messages between users. A messaging server accesses and manages messages of the message store. A plurality of servers provides an interface between the messaging server and different networks of the users. There is not a known system, however, that provides a plurality of interactive bulletin board messages at a single subscriber telephone number.

SUMMARY OF THE INVENTION

The present example of the invention is presented as a function added to voice mail enabled messaging system implemented in Voice over Internet protocol and/or public switched telephone system. The present invention provides a plurality of bulletin boards associated with a single subscriber telephone number. A caller to the subscriber telephone number hears a prompt to select a bulletin board. Each bulletin in the plurality of bulletin boards provides its own bulletin board message (BBM).

The subscriber records the bulletin board message. The subscriber and callers can record or listen to private or public messages associated with the bulletin board. The subscriber and callers can also record or listen to private or public comments in response to the BBM messages. Personal Identification Numbers (PINs) are required for access to private BBMs, caller comments and messages. Each bulletin board is associated with a bulletin board message area (BBMA) in the data base. The BBMs, call comments and messages are stored in the associated BBMA. Each BBMA provides a separate sub section for bulletin board messages, private messages, public messages, private comments, public comments and PINs.

The present invention provides an option to record and/or listen to messages and comments that can be geared to specific audiences, using PIN-restricted access as needed. The method and apparatus of the present invention also ensures customer privacy and increases the level of security by providing the user and subscriber an option to PIN-protect their contributions to the content comprising BBMs, recorded messages and comments. Separate PINs can be created to allow access to listen and record a private message. Separate PINs can be created to allow access to listen and record a private comment.

Thus it is an object of the present invention to provide a bulletin board messaging service wherein a plurality of BBMs relating to different audiences can be stored and retrieved by callers to the bulletin board messaging system associated with a single subscriber telephone number. It is another object of the present invention to provide selective access through PINs to allow callers to listen or record private messages associated with a bulletin board. It is another object of the present invention to provide selective access through PINs to record or listen or record private comments associated with a bulletin board. These and other objects of the invention will be described in the following description and figures.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE FIGURES

For detailed understanding of the present invention, references should be made to the following detailed description of an exemplary embodiment, taken in conjunction with the accompanying drawings, in which like elements have been given like numerals.

DETAILED DESCRIPTION OF THE PREFERRED EMBODIMENTS

Figure 1:
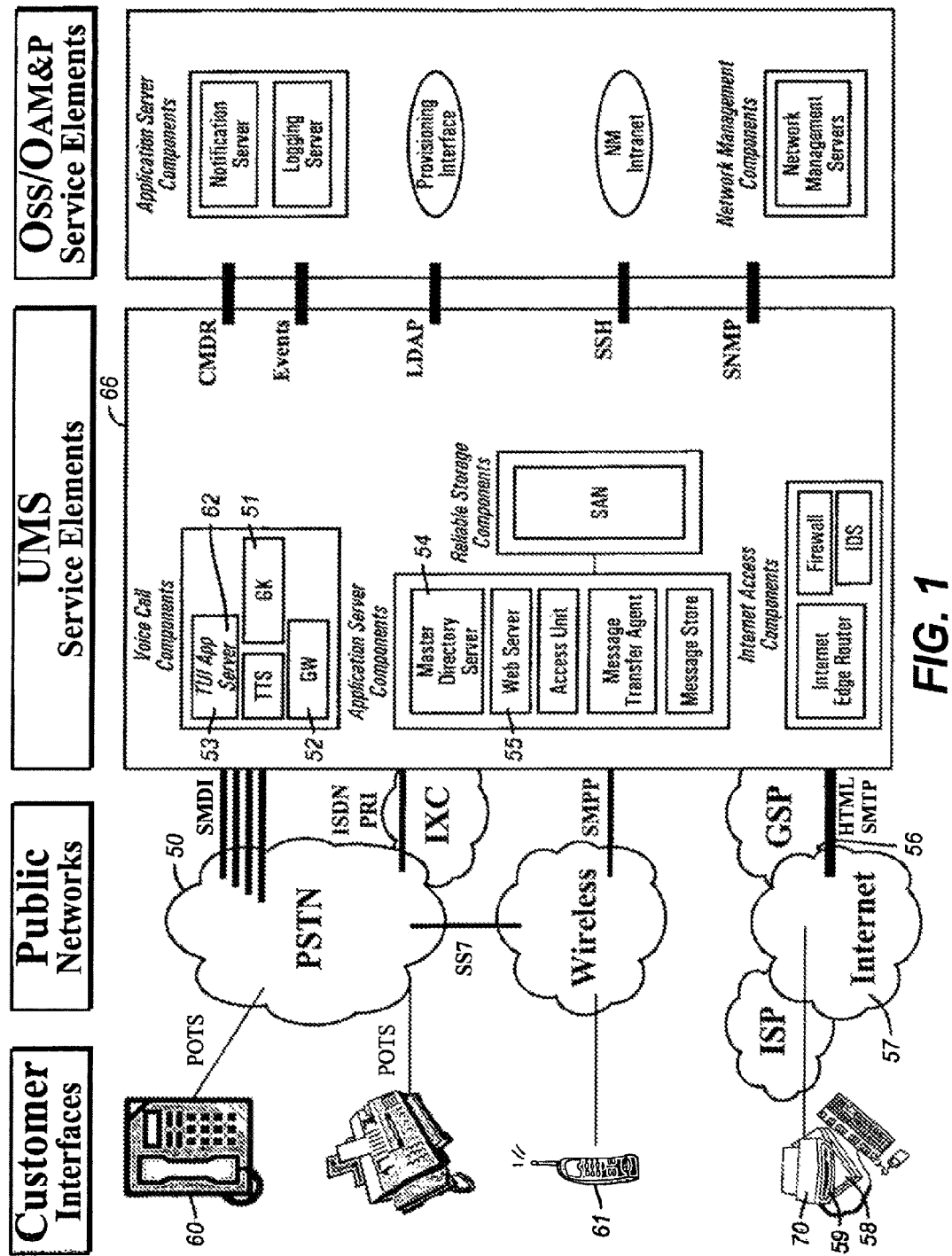
FIG. 1 illustrates an example of a high level architectural diagram of the environment in which the present example of the invention operates.

In view of the above, the present invention through one or more of its various aspects and/or embodiments is presented to accomplish one or more objectives and advantages, such as those noted below.

The present example of the invention is presented as a function added to voice mail enabled messaging system implemented in Voice over Internet protocol telephone system and/or a public switched telephone system. The present invention provides a plurality of bulletin boards associated with a single subscriber telephone number. A caller to the subscriber telephone number hears a prompt to select a bulletin board. Each bulletin in the plurality of bulletin boards provides its own bulletin board message (BBM). The subscriber records the bulletin board message. The subscriber and callers can record or listen to private or public messages associated with the bulletin board. The subscriber and callers can record or listen to private or public comments in response to private and public messages associated with the bulletin board.

Personal Identification Numbers (PINs) are required for access to private BBMs, messages and comments. Each PIN can be unique so that access to record or listen to each private BBM, message or comment can be controlled. Each subscriber telephone number provides an index to a bulletin board message area (BBMA) in a data base. Each BBMA provides a separate section for bulletin board messages, private messages, public messages, private comments, public comments and PINs. The present invention provides an option to record and/or listen to messages and comments that can be geared to specific audiences, using PIN-restricted access as needed. The method and apparatus of the present invention also ensures customer privacy and increases the level of security by providing the user and subscriber an option to PIN-protect the content for each of their recorded messages and comments. Separate PINs can be created to listen to a private message, listen to a private comment, record a private message, and record a private comment.

The information associated with the bulletin board messages includes information such as scheduled events, additional contact phone numbers or addresses where the subscriber might be reached, specific instructions to their callers, etc. These bulletin board messages may contain private information the subscriber would not normally want to share with the general public (e.g. anonymous or out-of-area callers, phone solicitors, etc.). Thus, the 4-digit PIN access is provided to control access to the information associated with the bulletin board.

Bulletin board messaging can be implemented in a vertical Interactive Voice Response System implemented in a telephone user interface (TUI), a voice mail enabled VoIP or a voice mail enable PSTN or AIN telephone system.

The following description provides examples of the types of messages that are recorded. They are for exemplary purposes only and not to be construed as limiting the application of the invention to only the examples presented.

For example, a particular subscriber telephone may have three bulletin boards set up associated with the subscriber telephone number. Bulletin Board # 1 for a Soccer Team, Bulletin Board # 2 for a Family Vacation and Bulletin Board # 3 for a Business Meeting.

Bulletin Board #1: Soccer Team Updates Scenario: A high school soccer team coach promises to provide weekly updates on his team's schedule, upcoming events, contact information, etc. Callers: Soccer team members and their parents, high school staff. Bulletin Board Message Content: The coach needs to let the team know what to do if the big game on Saturday has been cancelled due to weather, and if so, what the backup plan will be. Bulletin Board Recorded Message: "The championship game was rained out, but let's meet at Jay North's home at 3:30 pm for an ice cream sundae party. His address is 4205 Expedition Way. If you need directions, you can call him at 512-555-4321, or feel free to call my cell phone, 512-555-1234." Private Message Content: The coach wants to record a scouting report and strategy for listing by other coaches on his team with a PIN for access. Private Message: "We need to press No. 5 early to take the wind out of her sails. Don't let her intimate Susan. Let's be more aggressive and put them back on their heels." In this Scenario, only an assistant coach would have PIN to hear the scouting report. The players would not have access to the scouting report recorded as a Private Message.

Bulletin Board #2: The Family Vacation. Scenario: The customer and their family are going to be out of town on vacation for two weeks, and want to provide contact information. Callers: PIN restricted to family and close friends only. PIN Restricted Access Bulletin Board Message Content: Where the family will be, how to reach them if needed, travel dates, flight details, hotel reservations, phone numbers, etc. Pin Restricted Bulletin Board Recorded message: "We will be in San Francisco from Saturday, April 10 through Friday, April 25, staying at the Westin Hotel. If you need to reach us there, the phone number is 415-397-7000. As always, you can also reach us by cell phone at 512-293-3333. Otherwise, if you'd like to leave a message, please do so after the beep. Have a great week, everyone!"

Bulletin Board #3: Business Meeting. Scenario: A supervisor promises to leave instructions for her/his employees on the date/time/place a mandatory, off-site meeting is to occur on the weekend. Rather than calling each employee separately with the information, the supervisor can record the information for them to access individually. Caller: Business associates only. Bulletin Board Message Content: Date, time, and place of the meeting Recorded message: "Hi, team—we will be meeting in San Antonio at the Hard Rock Café on the Riverwalk at 11:30 am on Wednesday, May 26. If you need directions, just give me a call on my cell phone—512-555-1234."

Figure 4:
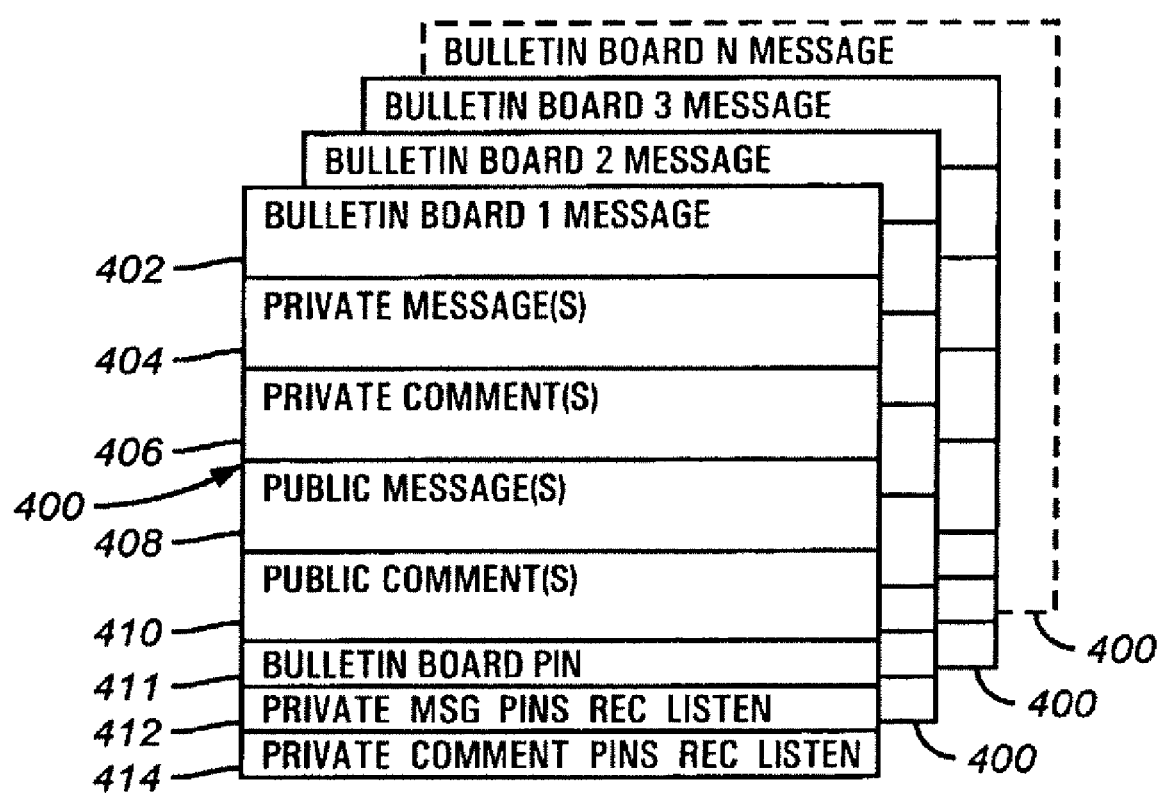
FIG. 4 illustrates a plurality of bulletin board messaging areas (BBMA) associated with a subscriber telephone number in the present example of the invention.

Following is an example of how Bulletin Board Messaging could fit in as an add-on to the existing voicemail service. FIG. 4 is an illustration of a bulletin board message area (BBMA) in a database in the present example of the invention. FIGS. 5-16 illustrate design flows for bulletin board provisioning and call processing. Provision flows illustrate an example of a process for a subscriber to provision a bulletin board over their phone by interacting with the BBMS function and BBMA using a telephone user interface (TUI). Bulletin Board: Call Processing flows illustrate the call flow process or caller experience using the TUI.

The following examples assume that the customer (referred to as a subscriber) has subscribed to a voice mail or messaging system that has already been provisioned. In the present example, the subscriber can provision up to 3 bulletin board messages and a separate set of PINs for each bulletin board message associated with each bulletin board. Each PIN can be unique within the context of the associated bulletin board and unique within the context of all bulletin boards associated with a subscriber telephone number. The subscriber has already performed the initial voice mail setup procedures on their phone. In the present example of the invention, the messaging system menu, via the TUI will allow DTMF entries: "5-1" for access to Bulletin Board #1, "5-2" for Bulletin Board #2, and "5-3" for Bulletin Board #3.

All subscriber and user prompts and all information associated with the BBMS function and BBMAs are stored is the database. In an alternative embodiment, all subscriber and caller prompts and inputs can also be made by accessing the prompts and information associated with the BBMS function and BBMAs and graphically presenting prompts to a caller or subscriber via a Web Client and accepting input from the caller or subscriber from the web client.

The Bulletin Board Messaging Service (BBMS) function provided in the present example of the invention is illustrated as a function added to a voicemail enabled Unified Messaging Service VoIP platform (UMS platform). In an alternative embodiment, the BBMS function can be implemented as well directly in the voice network switching infrastructure such as in an PSTN or advanced intelligent network (AIN).

When a caller calls a BBMS subscriber's telephone number and the number is busy or is not answered, the call is forwarded to a BBMS function added to the voice mail enabled UMS platform. The UMS platform is platform in which the BBMS function in the present example of the invention is implemented. Assuming that the subscriber has a BBMS function activated, the caller will be given the opportunity to go straight to voicemail to leave a message or access the BBMS function at the UMS platform.

The present example of the invention provides features such as caller selection of a bulletin board (BB) and PIN access to messages and comments. For example, a typical family household contains two parents and two children. A caller dialing the family home telephone number would expect to get one of the four family members. In an exemplary BBMS scenario, a caller calls the family home number. The home number is busy or rings without answering. The caller is forwarded to the BBMS function (hereinafter referred to as BBMS). In the context of the present example, BBMS refers to a BBMS function enabled at the UMS platform. The caller will then hear a special greeting: "For Bulletin Board <BB name #1>, press 1. For Bulletin Board <BB name #2>, press 2. "For Bulletin Board <BB name #3>, press 3. For Bulletin Board <BB name #4>, press 4." The BB names are stored in a database associated with the subscriber telephone number. Each bulletin board is provided with its own individually configured BBM with individual content associated with each BBMA. The bulletin board selected is by a caller selection process. Thus one aspect of the present invention is the provision of a plurality of bulletin boards each bulletin board with its own BBMA at a single telephone number.

Another aspect of the present invention provides a system for implementing a BBM service that includes a Unified Messaging Service (UMS) platform, which processes telephone calls from a public switched telecommunications network (PSTN), an telephone user interface (TUI) system and a graphic user interface (GUI). The UMS platform includes a database of BBM settings that corresponds to the subscriber telephone number. The TUI is accessible by the subscriber from any Dual Tone Multiple Frequency (DTMF) telephone through a PSTN.

The subscriber receives the BBMS information, the BBMS information including BBMA information and BBMS prompts for review via a TUI and adjusts the BBMS associated information to control the BBMS using a Dual Tone Multiple Frequency (DTMF) telephone over a TUI. In an alterative embodiment, the subscriber receives the BBMS information for review via a graphical user interface (GUI) at a web client and inputs BBMS information from the web client. The UMS platform receives the BBMS information from the subscriber, from either the DTMF or the graphical user interface, and communicates the BBMS information to the database, a master directory server (MDS), which updates the BBMS information in the database. The BBMS information is associated with a subscriber telephone number, which include each prompt and BBMA for each bulletin board associated with the subscribe telephone number. BBMS then processes calls to the telephone number of the subscriber in accordance with the updated BBMS information. A separate set of BBMS information is assigned for each bulletin board associated with the subscriber telephone number.

Another aspect of the invention provides a system for implementing a BBMS that includes a UMS platform, which processes telephone calls in a Voice Over Internet Protocol (VoIP) telephone network. The UMS platform provides the MDS comprising an MDS Server for storage of BBMS information for a plurality of BBMAs associated with a subscriber's telephone number.

The BBMS information updates can include but are not limited to BBMS prompts, bulletin board messages, private messages, public messages, private comments and public comments and PINS for access to each private BBMS function. Each BBMA is divided into BBMA sub areas for containing bulletin board messages, private messages, private comments, public messages, public comments, and PINS. PINs are separately assigned to control access to bulletin boards, access recording private messages, access to listening to private messages, access to recording private comments, access to listening to private comments. BBMS information is updated in the MDS in accordance with the caller or subscriber input.

The following discussion will provide further description of an exemplary embodiment of the invention. Turning now to FIG. 1, FIG. 1 illustrates a high level architectural diagram of the environment in which the present invention operates. The main components of the environment in which the present example of the invention resides comprises a public switched telephone network (PSTN) 50, Voice Over Internet Protocol (VoIP) Gateway 52, a Gatekeeper 51, TUI Application Server 53, Master Directory Server 54, Web Server 55, HTML link 56, Internet 57, mail box system 71, and Web Client 70.

A subscriber (customer) telephone 60 and caller telephone 61 are shown associated with the PSTN 50 of the architectural schematic of FIG. 1. The PSTN comprises at least one Signal Transfer Point (STP), Signal Service Point (SSP) and Service Control Point (SCP) and database component, which are not shown, but are well known in the art. The BBMS function 62 runs on the TUI application server 53 which is implemented on a Sun/Solaris platform at the UMS platform 66.

The Gatekeeper (GK) 51 determines where calls coming from the Voice over IP Gateway 52 should be routed. The Voice over IP Gateway (VoIP GW) 52 provides the bridge between the PSTN and the VoIP systems. A Telephone User Interface (TUI) is provided for the BBM. The TUI runs as a Logica CMG uOne application and is implemented on a Sun/Solaris or PC/Linux platform. The TUI provides a Text-To-Speech Server that converts text provided by the TUI into speech that is played over the telephone. The Web Server 55 provides web pages for user input for configuration of the BBMS information described below. Subscribers use a browser, such as Internet Explorer (IE) or Netscape browser to access mail services over the web. The web server also provides subscribers with administrative capabilities such as setting up and configuring their BBMS account or changing their password in the BBMS information. The software is provided by Data Connections Limited (DCL) and implemented on a Sun/Solaris or PC/Linux platform.

The Master Directory Server (MDS) 54 is implemented on a Lightweight Directory Access Protocol (LDAP) Server and provides storage for BBMS information. The TUI Application Server and Web Server components use the MDS.

A data network of the invention includes a Web Client 70, and a Web server 55, and Master Directory Server (MDS) 54 accessed through the Internet 57. The Web Client 70 includes a personal computer (PC), i.e., a graphical user interface (GUI) 59, operating client software 58, an example of which is ICW Client, available from SBC. Alternatively, the client software 58 can be run at the Web server 55. The MDS 54 stores the subscriber and caller interface prompts for the BBMS. The subscriber telephone 61 and caller telephone 60 (or other DTMF telephone) interact with BBMS through TUI 53. In an alternative embodiment, the subscriber and caller interact with BBMS through the Web Client 70 (or other Internet compatible GUI) through the Web server 54, via the Internet 57. The MDS also maintains all BBMS information for the BBMS.

In an alternative embodiment, the Web Client 70 incorporates a Web browser, such as Microsoft Internet Explorer, available from Microsoft Corporation, or Netscape Navigator, available from Netscape Communications Corporation. In one embodiment, the Web Client 70 is implemented with an IBM Pentium based PC, running the Linux operating system, available from, for example, Free Software Foundation, Inc., or the Microsoft Windows operating system, and running the Microsoft Internet Explorer, Netscape Navigator or Hot Java, available from Sun Microsystems, Inc., Web browser software. An embodiment of the invention includes the Web server 54 running the Linux or Microsoft Windows operating system and the Apache Web server software, available from the Apache Software Foundation, or the Jigsaw Web server software, available from World Wide Web Consortium (W3C).

A subscriber can modify the BBMS information from any DTMF telephone. The subscriber dials a local number to access the TUI Application Server 53 to interact with the BBMS. The subscriber is prompted to enter an account number, along with a personal identification number (PIN), further discussed below. The subscriber then has the ability to change the PIN or change the BBMS information. In an alternative embodiment, the subscriber has the option to access the BBM settings using a GUI via the Internet 57. Over the Web connection, the subscriber is able to implement all of the DMTF input functions identified herein.

Figure 2:
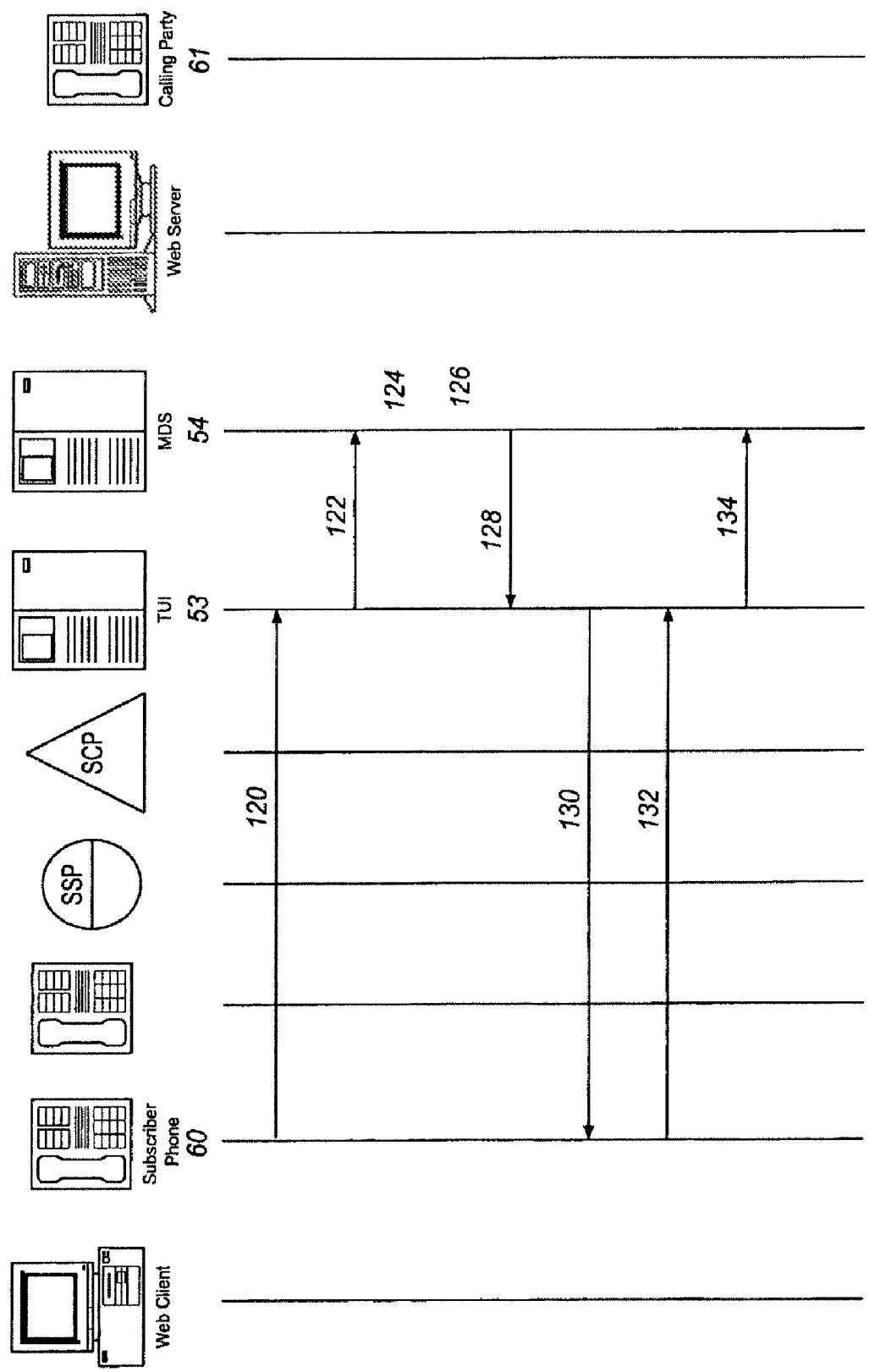
FIG. 2 depicts an example of interaction with the bulletin board messaging service (BBMS) function over the Internet, using a GUI in the present example of the invention.

FIG. 2 depicts interaction with BBMS information over the TUI 53, using a DTMF telephone 60. Turning now to FIG. 2, the subscriber calls a BBMS access number from any DTMF telephone 60, which directly accesses the TUI 53, shown at step 120. FIG. 2 depicts, for example, the call originating from the subscriber phone 60. The TUI 53 receives the call and initiates a request for various authentication information, including the account and PIN numbers. These numbers coincide with the account and PIN numbers used to access the BBMs via the Internet 57. The pre-programmed voice announcements for this aspect of the invention reside in the TUI 53. The authentication information is provided using the touch tones of the DTMF telephone 60. The TUI 53 forwards the authentication information to the MDS 54 at step 122 for verification at step 124.

The MDS 54 retrieves at step 126 the current BBMS information and provides the TUI 53 with the BBMS information associated with the subscriber telephone number at step 128. The TUI 53 then verbally recites a menu of options to the subscriber at step 130 based on the BBMS information received from the MDS 54. BBMS information includes system messages, prompts and menus for each bulletin board. The subscriber listens to the system messages including selections or options based on the BBMS information and inputs various selections at step 132 via the telephone touch tone key pad. The subscriber BBMS information is then sent at step 134 by TUI 53 to MDS 54 for storage associated with the subscriber telephone number including BBMS information stored in the BBMA for a selected bulletin board. The BBMS information is stored in the MDS for later use by BBMS.

Figure 3:
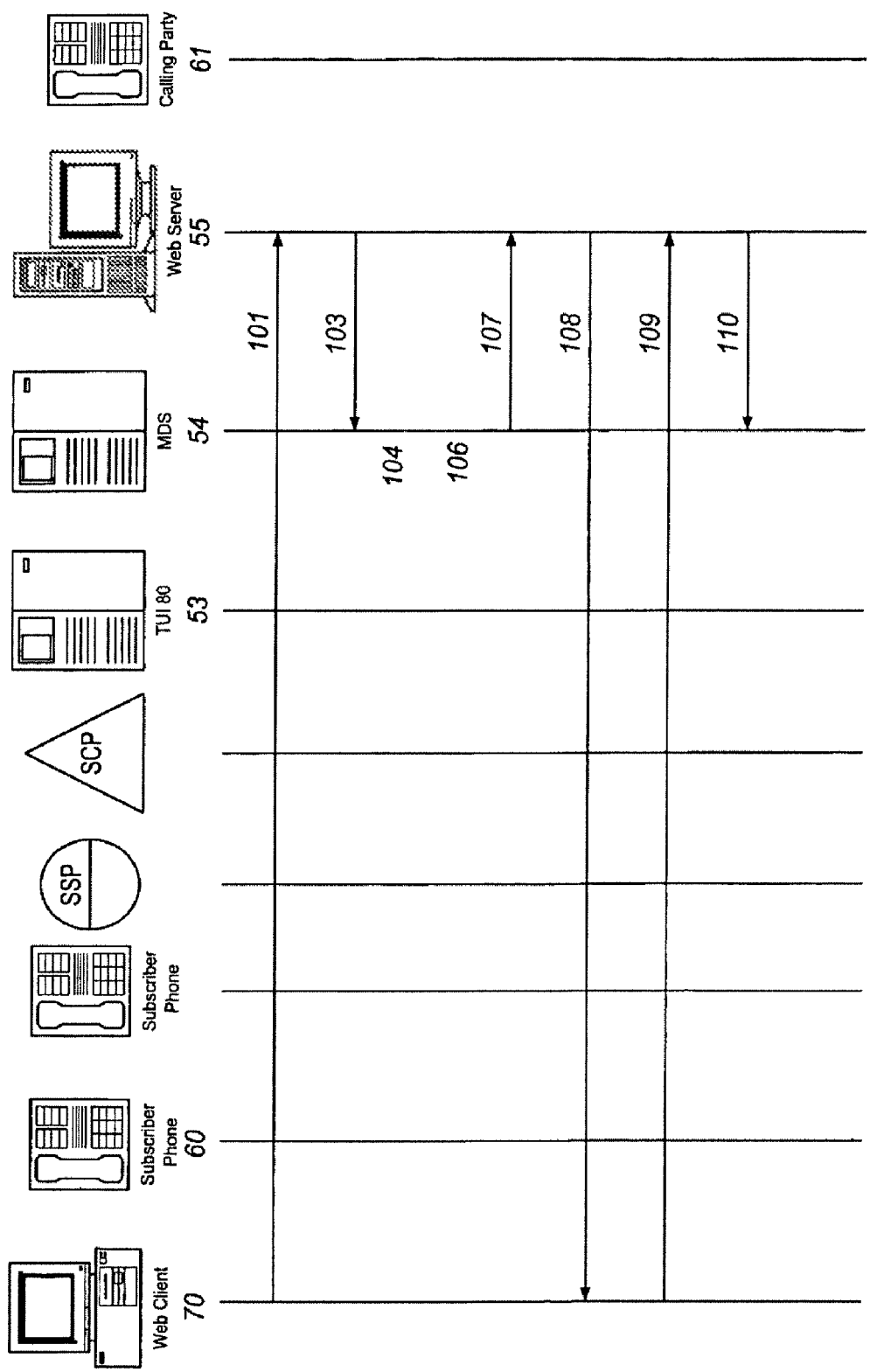
FIG. 3 depicts an example of interaction with BBMS over an telephone user interface, using a DTMF telephone in the present example of the invention.

In an alternative embodiment, BBMS information can also be configured via BBMS configuration access screens at Web Client 70. FIG. 3 depicts an alternative embodiment interaction with BBMS over the Internet, using a GUI, for accessing and updating the service, including building the priority screening lists and weekly schedules, discussed above. In order for the subscriber to access BBM via the Internet 57, the subscriber accesses a unique uniform resource locator (URL) associated with the UMS platform. The URL is an address and identifies the appropriate protocol for communicating with the service over the Web. When the subscriber accesses the Internet, the Web server 55 provides BBMS Web screens, transmitted from the MDS 54.

As shown in FIG. 3, at step 101 the subscriber accesses BBMS information by connecting from the Web Client 70 to the Web server 55 through the Internet 57. The Web server 55 then accesses the MDS 54, which stores and updates the BBMS information at step 103. The Web Server 55 receives HTTP messages from the subscriber Web Client 70 and provides HTML Web pages in response to the subscriber's input. The Web pages relate to the subscriber's BBM information, as indicated by the MDS 54.

The user provides authentication information to access the corresponding subscriber account. The MDS 54 performs the authentication at step 104. The MDS 54 queries the subscriber for an account number and associated password, which confirms the subscriber's identity. The MDS 54 then retrieves the account number and associated password information from BBM settings to confirm that the subscriber is an authorized user. After successful authentication, the MDS 54 retrieves the BBMS information at step 106. The MDS 54 forwards the BBMS information to the Web server 55 at step 107, which forwards the BBMS information to Web client 70 via the Internet 57 at step 108. The BBMS information is input by the subscriber from the Web client 70 through the Web server 55 to the MDS 54, indicated respectively at steps 109 and 110 of FIG. 3.

Turning now to FIG. 4, an example of a Bulletin Board Message Area (BBMA) 400 is illustrated. The BBMA divided into a plurality of sub areas. Subscriber created bulletin board messages are stored in BBMA sub area 402. Private messages are stored in BBMA sub area 404. Private comments are stored in BBMA sub area 406. Public messages are stored in BBMA sub area 408. Public comments are stored in BBMA sub area 410. A bulletin board PIN for access to the Bulletin Board is stored in BBMA sub area 411. The bulletin board PIN is preset to the last 4 blanks, which indicates to BBMS that no PIN is required to access the bulletin board, that is, the bulletin board is public until the subscriber defines a PIN for accessing the bulletin board. Private message PINS for recording and listening to private messages are stored in BBMA sub area 412. Private comment PINS for recording and listening to private comments are stored in BBMA sub area 414. A plurality of BBMAs 400 are assigned to each BBMS subscriber telephone number. One BBMA is assigned to each bulletin board associated with a subscriber telephone number.

Figure 5:
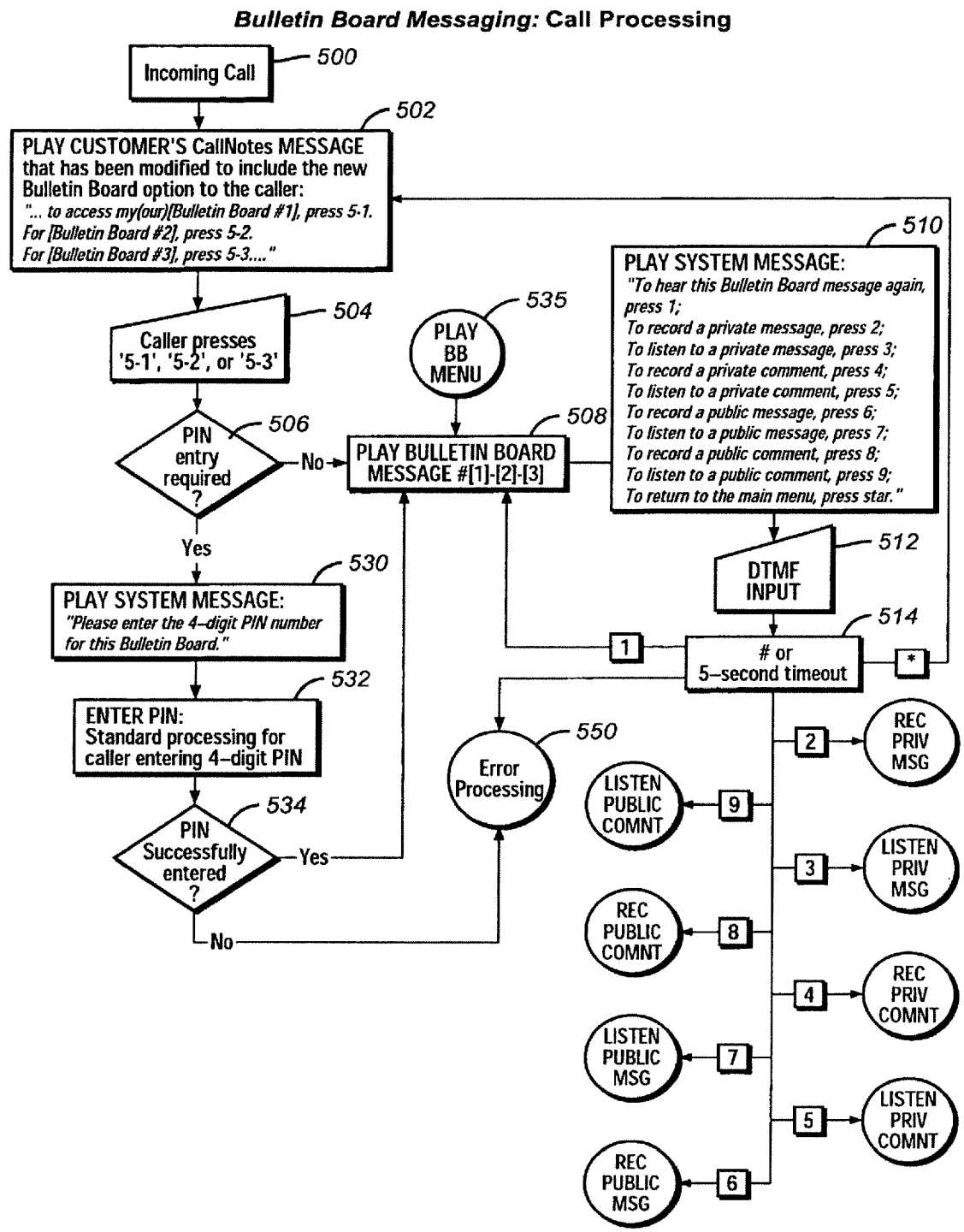
FIG. 5 illustrates an example of the functions performed by the BBMS function in processing an incoming call to a subscriber telephone number in which a caller is prompted to select one of a plurality of bulletin boards in the present example of the invention.

Turning now to FIG. 5, an incoming call 500 is received by BBMS, at a subscriber telephone number in a BBMS enabled telephone messaging system. In the present example, in block 502 BBMS plays a prompt, that is, BBMS prompts the caller to enter a 5-1 to access bulletin board # 1, enter 5-2 to access bulletin board # 2, enter 5-3 to access bulletin board # 3, and repeats a similar prompt of each bulletin board associated with a subscriber telephone number, sequentially announcing the bulletin board numbers up to the total number of bulletin boards, N. The caller presses a 5 and a number 1-N to select one of N bulletin boards, numbered 1-N.

BBMS then checks 506 the BBMA sub area 411 associated with the selected bulletin board to see if a PIN is required for general access to the bulletin board. If the bulletin board PIN is PUBLIC, then no PIN is required for access to the bulletin board. If no PIN is required to access the bulletin board, at block 508 the BBMS enabled service plays the selected bulletin board message, 1-N. At block 510 BBMS then prompts the caller "To hear the general message again, press "1," to record a private message press "2," to listen to a private message press "3," to record a private comment, press "4," to listen to a private comment, press 5, to record a public message, press 6, to listen to a public message, press 7, to record a public comment, press 8, to listen to a public comment press 9, to return to the main menu, press star."

Caller DTMF input is received at block 512. If the caller presses a "1," at block 508 the BBM service plays the bulletin board message. The bulletin board message could be, for example, a baseball schedule.

If the caller presses a 2, and an appropriate PIN he can record a private message associated with the selected bulletin board in BBMA sub area 404. The private message could be the starting line entered by the head coach, which only assistant coaches with the listen to private message PIN can hear. If a subsequent caller presses a "3" to listen to a private message, the caller is prompted for a PIN and if the PIN is successfully entered, the BBMS allows the caller to listen to private messages associated with the selected bulletin board retrieved BBMA sub area 404. The private message could be, for example, the starting line up. The PIN to record the private message and the PIN to listen to the private message can be different so that only the coach can make up and record the starting lineup and only the assistant coaches can listen to the starting lineup.

If the caller presses a "4" to record a private comment, possibly in response to the private message, the caller is prompted for an appropriate PIN record a private comment. If the PIN to record a private is successfully entered, the BBMS allows the caller to record a private comment associated with the bulletin board or private message in BBMA sub area 406. A private comment might be a suggestion from an assistant coach on a change in the starting lineup. Again a PIN is required to enter the private comment. A PIN is also required to listen to the private comment. The PIN to record a private comment and the PIN to listen to a private comment can be different. Therefore, for example, only the assistant coaches and head coach have the PIN to record a private comment and only the head coach has the PIN to listen to the private comments. In this example, only the head coach could listen to the assistant coaches' private comments. The assistant coaches could not listen to each other's private comments. If caller presses a 5, to listen to a private comment the private comment is retrieved from BBMA sub area 406. The private comment could be a suggestion to the head coach on the starting line up, which only those having the proper PIN could hear. If the caller enters the correct PIN the caller is allowed to listen to the private comment.

If the caller presses a "6" to record a public message, the BBM allows the caller to record a public message and store it in BBMA sub area 408 associated with the bulletin board. The public message could be, "This is Jimmy Smith, can anyone give me a ride to the game?" If the caller presses a 7, the caller can listen to public messages, such as Jimmy's request for a ride. For example, a caller might hear the public message, Jimmy's request and reply by pressing 8 to record a comment in response to Jimmy public message requesting ride, recording a public comment, "Jimmy, this is Mike, I can give you a ride" in the public comments BBMA sub area 410 of the BBMA for the selected bulletin board. Jimmy could later hit a 9, as a caller and listen to the public comment offering him a ride. No PIN is required to listen to a public comment or to record a public comment. No PIN is required to listen to a bulletin board with a bulletin board PIN set to PUBLIC.

If the caller selects a bulletin board that requires a PIN for access 506 the BBM enabled system requests at 530 "Please enter the 4-digit PIN number for this bulletin board." The PIN is entered by the caller and standard PIN processing well known in the art occurs at 532. The bulletin board PIN is stored in BBMA sub area 411 for the selected bulletin board. If the correct PIN matching the PIN stored in the BBMA sub area 411 is successfully entered, BBM call processing function proceeds to 508 and proceeds as discussed above. An error message is announced at 550 when a PIN is not successfully entered.

Figure 6:
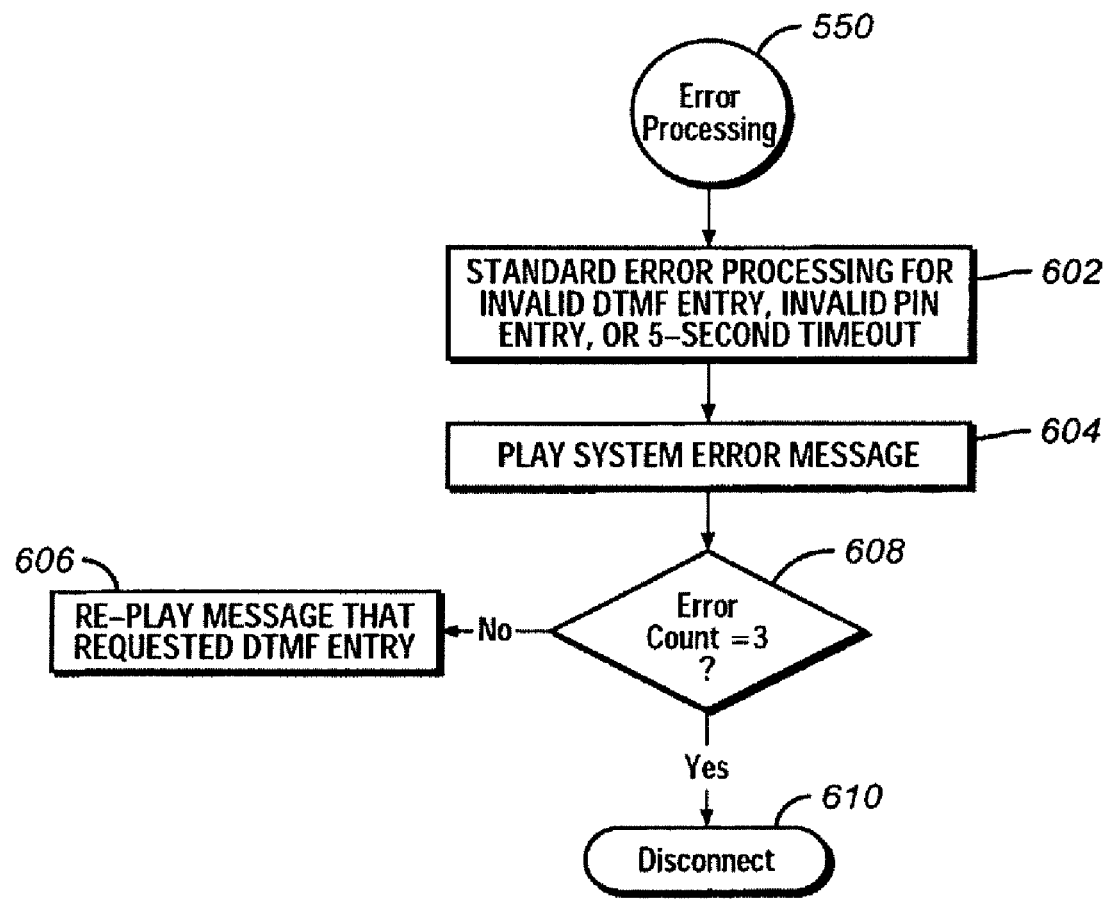
FIG. 6 illustrates an example of the functions performed by the BBMS function in processing an incoming call to a subscriber telephone number in which a caller is prompted to correct an input error or is disconnected in the present example of the invention.

Turning now to FIG. 6, at block 602 the BBMS function performs standard error processing when encountering Invalid DTMF entry, invalid PIN entry or a 5-second time out. The BBMS function plays a system error message at 604 and proceeds to an error count at 608. If the number of errors is equal to 3 the caller is disconnected. If the number of errors is less than 3, the DTMF input request is replayed for the caller.

Figure 7:
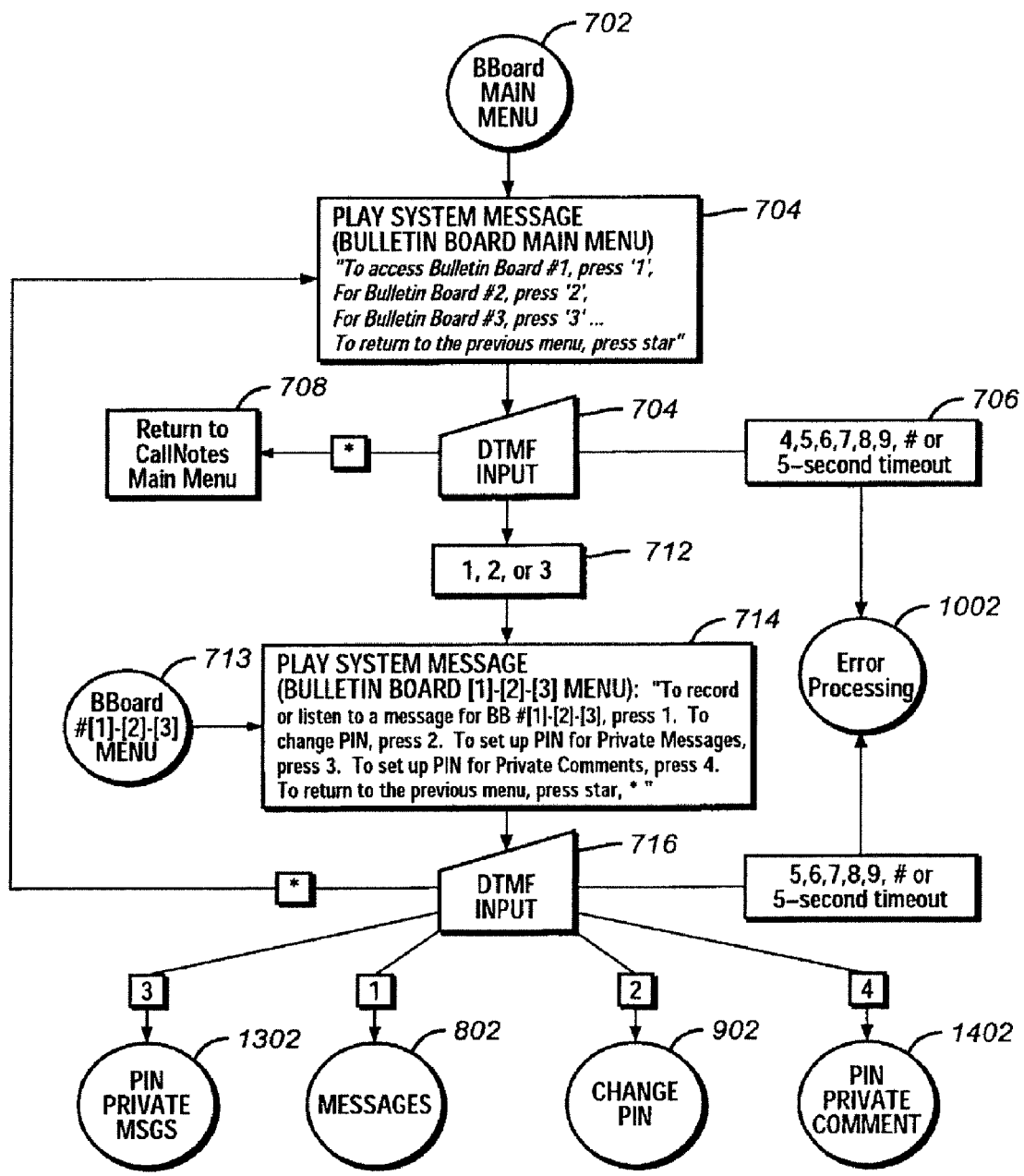
FIG. 7 illustrates an example of the functions performed by the BBMS function in provisioning a bulletin board in response to subscriber telephone input in which a caller is prompted to set up one of a plurality of bulletin boards in the present example of the invention.

Turning now to FIG. 7, the provisioning or setup processing performed by the BBMS function is presented. At 704 the bulletin board main menu is presented to the caller. The menus are stored on the MDS associated with the subscriber telephone number. The menus are accessed on the MDS by the TUI and presented to the caller telephone. Note that a subscriber need not call in on the subscriber telephone to access BBMS information. A system message comprising the bulletin board menu is played to the caller telephone as follows: To access bulletin board # 1, press "1," To access bulletin board name # 2, press "2," To access bulletin board # 3, press "3," sequentially for all bulletin boards 1-N. DTMF input from the subscriber is accepted at 710. If a star "*" is entered BBMS returns to the main messaging system menus at 708. If a number greater than N is entered, or a 5-second time out occurs before DTMF input is received, the BBMS function proceeds to 706 and error processing at 1002.

When a bulletin board number between 1 and N is entered 712 the BBMS function proceeds to play system message "To record or listen to a message for Bulletin board 1-N, press 1. To change PIN number press 2. To setup PIN for private messages press 3. To set up PIN for private comments, press 4. To return to the previous menu press star, (*)."

If the subscriber enters a 1, the BBMS function proceeds to record or listen to bulletin board messages 802. If the subscriber enters a 2, BBMS proceeds to change the bulletin board PIN 902. If the subscriber enters a 3, BBMS proceeds to set up a PIN for private message 1302. If the subscriber enters a 4, BBMS proceeds to set up a PIN for private comments 1402. If the subscriber enters a 5, 6, 7, 8, 9 or # BBMS proceeds error processing 1002.

Figure 8:
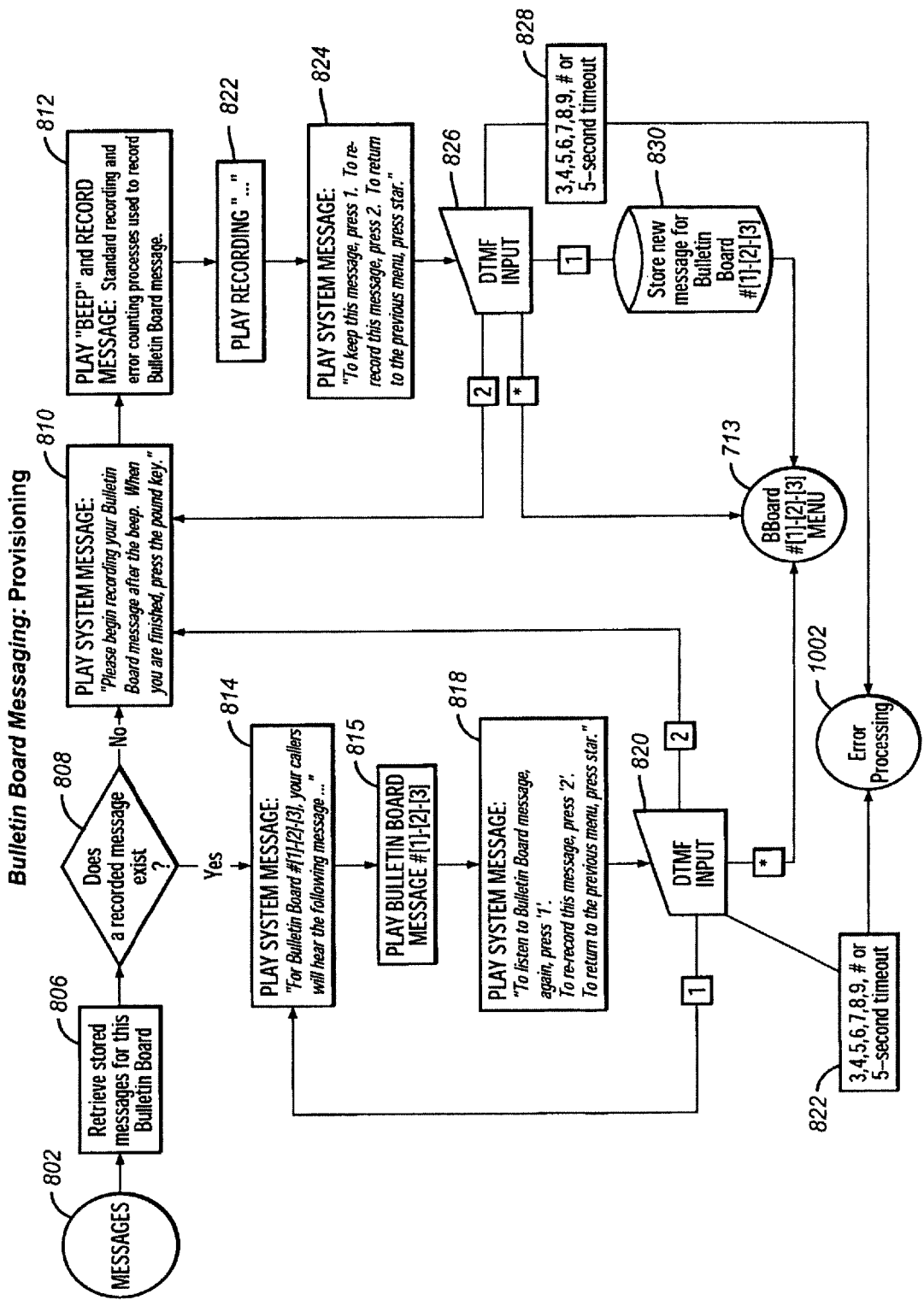
FIG. 8 illustrates an example of the functions performed by the BBMS function in provisioning a bulletin board in response to subscriber telephone input in which a caller is prompted to record a message for one of a plurality of bulletin boards in the present example of the invention.

Turning now to FIG. 8, FIG. 8 illustrates BBMS providing for subscriber recording or listening to bulletin board messages. At 806, BBMS retrieves stored bulletin messages from storage, for example the MDS or other storage accessible to BBMS. At 808 BBMS determines a bulletin board message exists. BBMS at 814 plays a system message from the MDS associated with the bulletin board. The system message played is "For bulletin board "#[1]-[2]-[3], your caller will hear the following message . . . " At 816 BBMS plays the bulletin board message #[1]-[2]-[3], for the selected bulletin board. AT 818 BBMS plays system message, "To listen to this bulletin board message again, press 1. To re-record the message, press 2. To return to the previous menu, press star." DTMF input from the caller is received via the TUI at 820. If the caller input is a "1" BBMS returns to block 814 to play the system message again. DTMF input from the caller is received via the TUI at 820. If the caller input is a "2" BBMS proceeds to block 810 to play the system message for recording a bulletin board message, discussed below. DTMF input from the caller is received via the TUI at 820. If the caller input is a "*" BBMS proceed to block 713 and plays the system message for another selection as shown in FIG. 7. If the caller enters a 3, 4, 5, 6, 7, 8, 9 or # BBMS proceeds to error processing 1002.

If at 808 the BBMS function determined that no bulletin board message exists, BBMS plays the system message 810 "Please begin recording you Bulletin Board Message after the beep. When you are finished, press the pound key (#)." BBMS then sounds a tone or beep signal 812 and standard recording and error counting processes occur to record the bulletin board message. After the message is recorded BBMS then plays the recorded message back for review by the subscriber at 822. BBMS then plays a system message at 824 "To keep this message, press 1. To rerecord the message, press 2. To return to the previous menu, press star (*)." Subscriber DTMF input is accepted at 826. If the subscriber enters a 1, BBMS stores the recorded message in storage, in this example, the MDS 830. BBMS then returns to 713. If the subscriber enters a 2, BBMS returns to 810. If the subscriber enters a "*" BBMS returns to 713. If the subscriber enters a 2, BBMS returns to 810. If the subscriber enters a number greater than 2, times out without entry for 5 seconds, or enters the pound sign "#", 828 then BBMS proceeds to error processing 1002.

Figure 9:
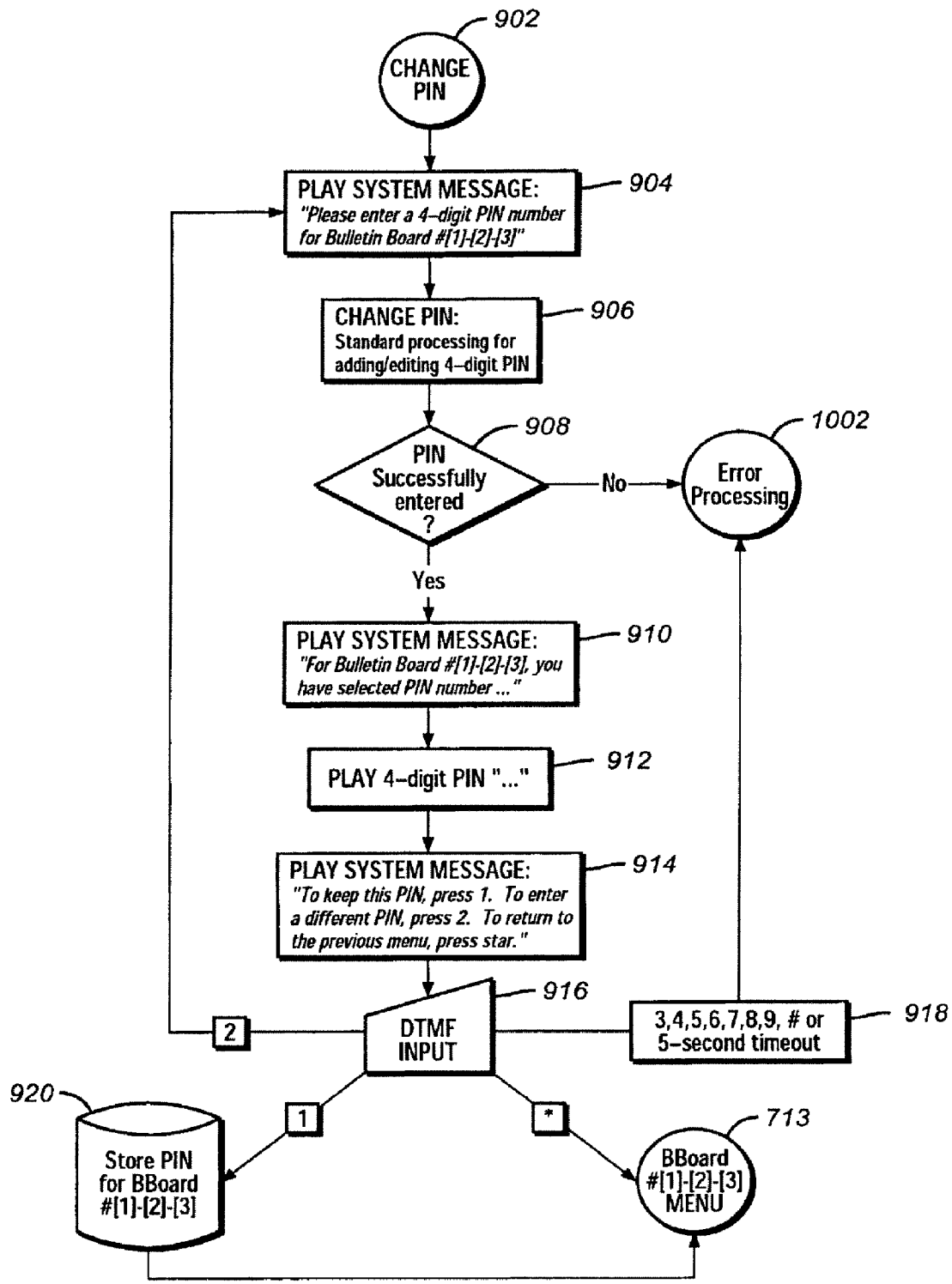
FIG. 9 illustrates an example of the functions performed by the BBMS function in setting up a bulletin board Personal Identification Number (PIN) in response to subscriber telephone input in which a caller is prompted to select a PIN for one of a plurality of bulletin boards in the present example of the invention.

Turning now to FIG. 9, to change a bulletin board PIN 902, BBMS plays system message 904 "Please enter a 4-digit PIN number for bulletin board #[1, 2, 3, N]." Standard processing for adding/editing PINs is performed at 906. The PIN is retrieve/stored in the BBMA sub area 411 for the selected bulletin board. The bulletin board number (#) corresponds to the bulletin board selected by the caller. If the PIN is not successfully entered 908 BBMS proceeds to error processing 1002. If the PIN is successfully entered 908 BBMS proceeds to retrieve and play the system message 910 for the currently selected bulletin board, "For bulletin Board [1, 2, 3 . . . N] you have selected PIN number" and plays the 4-digit PIN entered by the subscriber at 912. All messages for announcement and display are stored in and retrieved from storage, in the current example, the MDS 54.

BBMS then retrieves and plays the system message 914 for the current selected bulletin board, "To keep this PIN, press 1. To enter a different PIN press 2. To return to the previous menus, press star." BBMS then accepts DTMF input 916. If the subscriber enters a 1, BBMS proceeds to 920 to store the PIN for the currently selected bulletin board in BBMA field 411. If the subscriber enters a 2, BBMS proceeds to 904, the previous menu, to play the system message as described above. If the subscriber enters a "*," BBMS proceeds to 713 to the bulletin board menu, as described above. If the subscriber enters 3, 4, 5, 6, 7, 8, 9 or a pound sign "#" or a 5-second timeout with an input occurs at block 918 BBMS proceeds to 1002 error processing.

Figure 10:
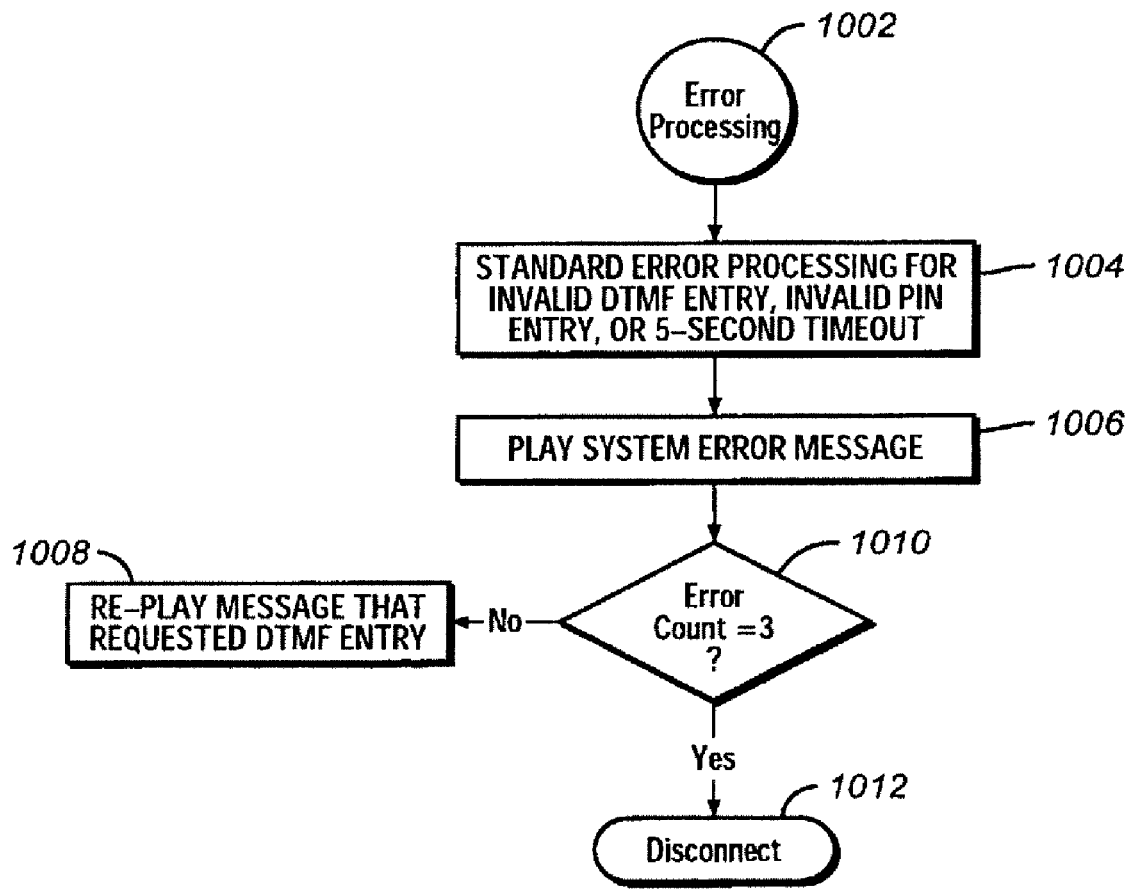
FIG. 10 illustrates an example of the functions performed by the BBMS function in setting up a bulletin board in response to subscriber telephone input in which a caller is prompted to correct an input error or is disconnected in the present example of the invention.

Turning now to FIG. 10, BBMS performs standard error processing for Invalid DTMF entry, invalid PIN entry or when a 5-second time out occurs at 1004. BBMS plays a system error message at 1006 when an error occurs and proceeds to an error count at 1010. If the number of errors is equal to a certain number for example, 3 the caller is disconnected 1012. If the number of errors is less than 3, the DTMF input request is replayed for the caller 1008.

Figure 11:
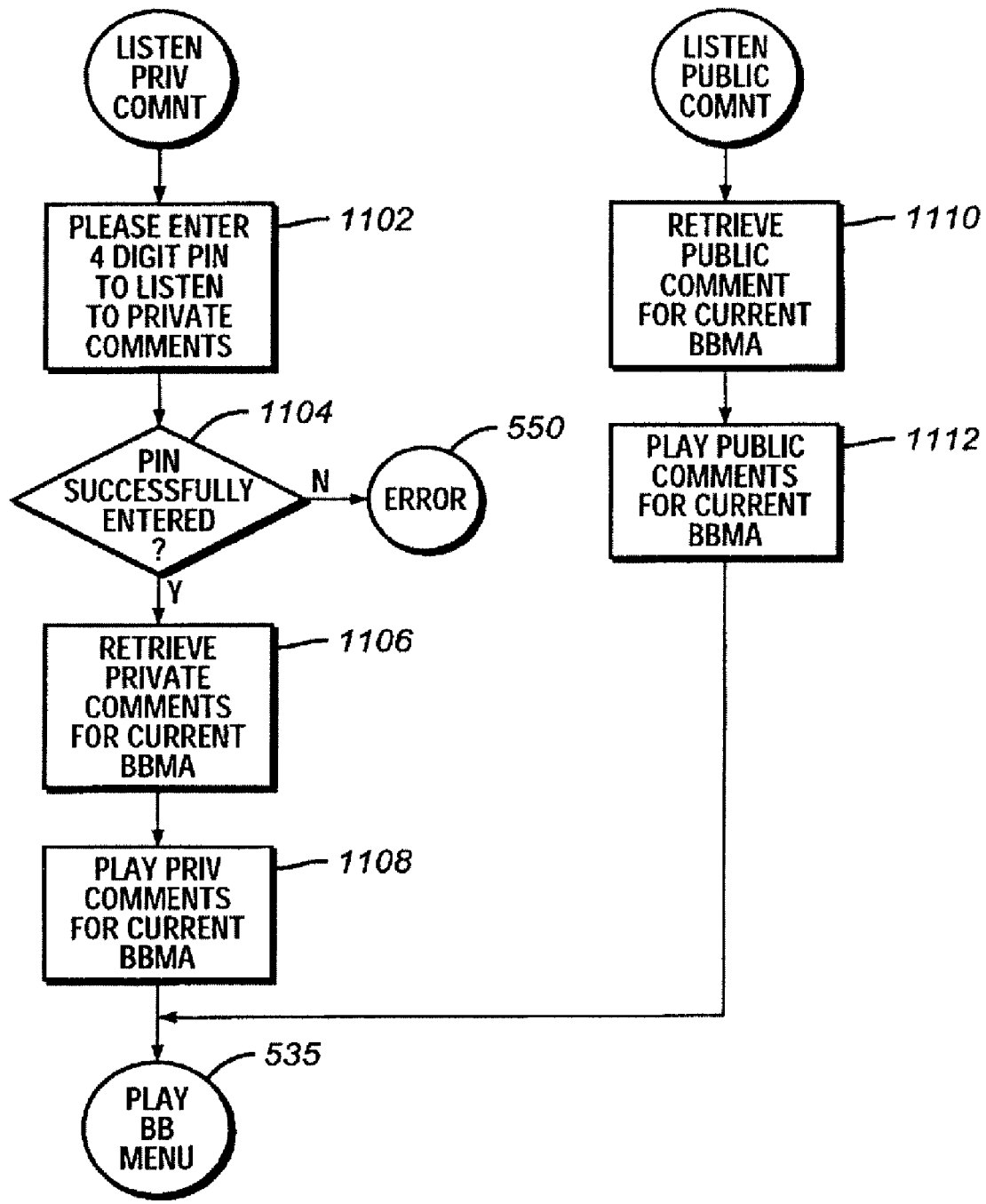
FIG. 11 illustrates an example of the functions performed by the BBMS function in processing to enable a caller to listen to a PIN restricted private comment or a public comment, in which a caller is prompted to enter a PIN to listen to private comments for one of a plurality of bulletin boards in the present example of the invention.

Turning now to FIG. 11, BBMS processing for a caller that has selected 5 in the menu at 510 in FIG. 5 to "listen to a private comment" is illustrated. At block 1102 BBMS plays a system comment, "Please enter the 4-digit PIN to listen to a private comment" and receives caller DTMF input from the TUI. At block 1104 BBMS determines if the PIN is successfully entered, using well known PIN processing. If the correct PIN is successfully entered, that is, if the PIN entered matches the PIN in BBMA sub area 414 for listening to a private comment, the BBMS process proceeds to block 1106, where BBMS retrieves the private comment(s) from the private comment area for the currently selected BBMA in the MDS. At block 1108, BBMS plays the retrieved private comments to the user, using the TUI. BBMS then proceeds to 535 "Play BB Menu" where the caller can hear the private comment again or select another option. At block 1110 BBMS processing for a caller that has selected 7 in the menu at 510 in FIG. 5 to "Listen to Public Comment." The public comment is retrieved from BBMA sub area 410 associated with the current or selected bulletin board and played for the caller.

Figure 12:
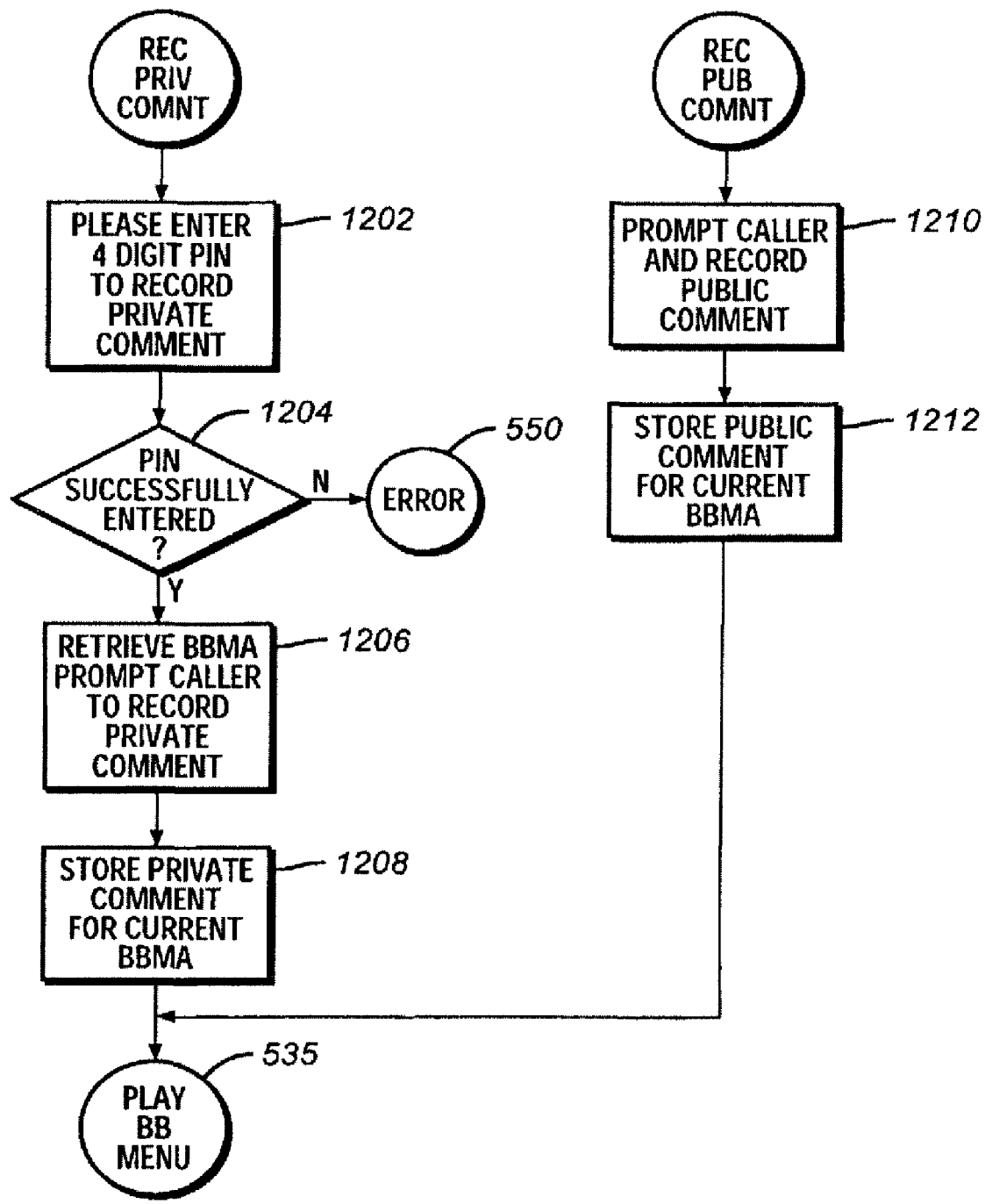
FIG. 12 illustrates an example of the functions performed by the BBMS function in processing to enable a caller to record a PIN restricted private comment or a public comment, in which a caller is prompted to enter a PIN to record a private comment for one of a plurality of bulletin boards in the present example of the invention.

Turning now to FIG. 12, the BBM processing for recording a public or private comment is illustrated. At block 1202 BBMS plays system comment "Please enter the 4-digit PIN to record a private comment." The BBM then receives input from the user via the TUI. At block 1204 BBMS determines if the 4-digit PIN was successfully entered using standard PIN processing. If the PIN is not entered correctly, BBMS proceeds to error processing 550. If the PIN is entered correctly, at block 1206 BBMS retrieves database index to private comments section of the currently selected BBMA private comment sub area 406. The private comments sub area of the currently selected BBMA comment area is the repository for previously recorded private comments, if any, for the currently selected bulletin board associated with the subscriber telephone number. At block 1208 BBMS prompts the caller via the TUI, receives caller input via the TUI, records the comment spoken by the user and adds it to the other private comments for the currently selected BBM comment area. BBMS the stores the newly recorded private comment along with previously recorded private comments in the data base in the private comment area for the currently selected BBM comment area at block 1210. BBMS then returns to 535 to allow the user to select another option.

At block 1210 BBMS processing for a caller that has selected 8 in the menu at block 510 in FIG. 5 to "Record Public Comment." BBMS prompts the caller to record a public comment at block 1210. The public comment is recorded and stored at block 1212 in BBMA sub area 410 associated with the current or selected bulletin board and played for the caller. BBMS then returns to 535 to allow the user to select another option.

Figure 13:
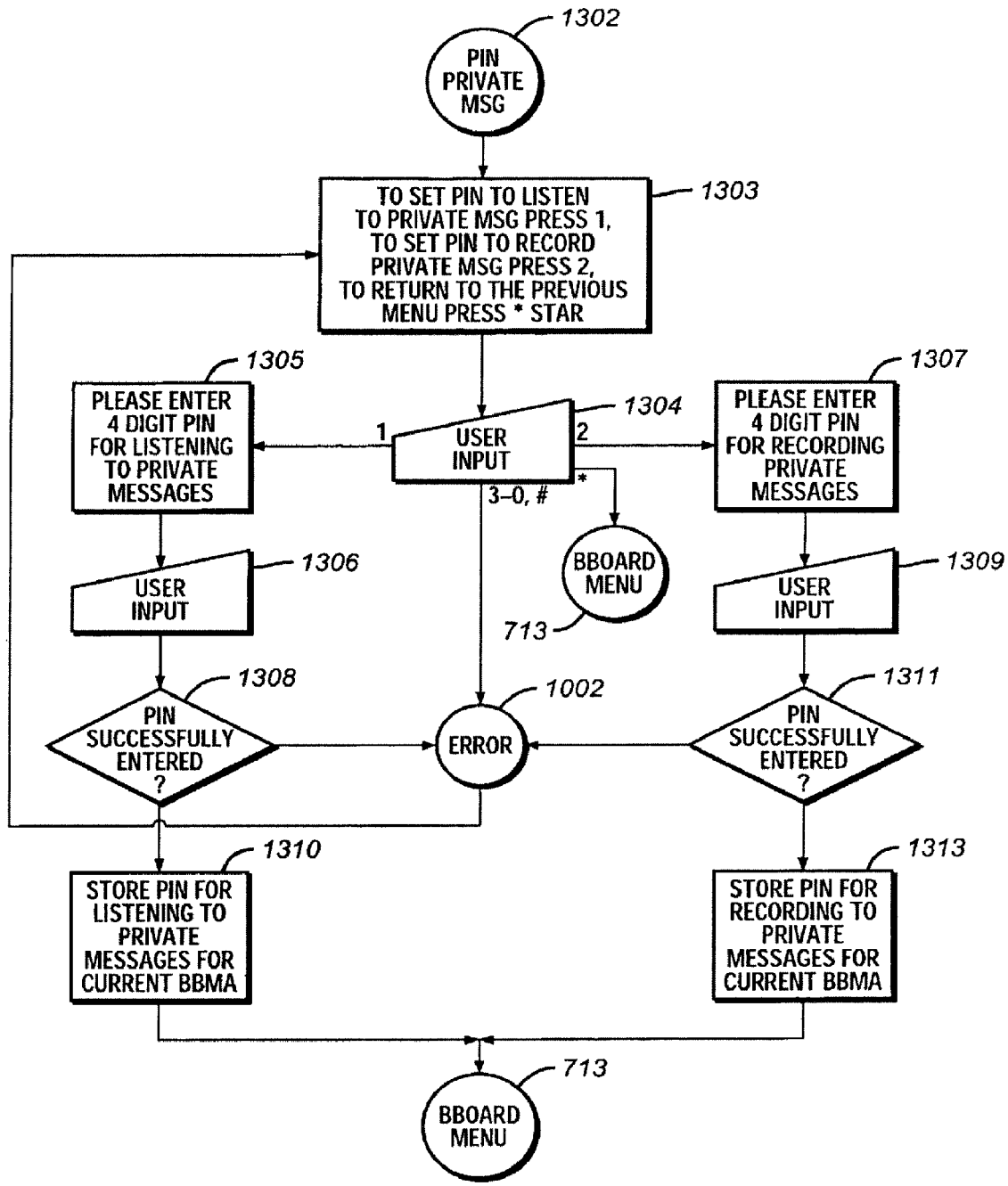
FIG. 13 illustrates an example of the functions performed by the BBMS function in setting up a PIN for listening to or recording private messages associated with one of a plurality of bulletin boards in the present example of the invention.

Turning now to FIG. 13, at 1303 BBMS function plays the system message, "To set up a pin to listen to a private message, press 1, To set a PIN to record a private message, press 2, to return to the previous menu press *." At 1304 user input is accepted. If the user inputs 1, BBMS proceeds to block 1305 and plays the system message "Please enter a 4-digit PIN for listening to a private message." BBMS then receives user input via the TUI at block 1306 for the private message PIN. If the PIN for listening to private messages is entered successfully 1308, BBMS stores the PIN for listening to private messages in the database, MDS at block 1310. If the private message PIN is not entered successfully 1308, BBMS goes to error processing 1002. BBMS then returns to the main menu at block 1303. If the user inputs *, BBMS returns to BBoard menu 713. If the user inputs 3-0 or #, BBMS proceeds to error processing 1002.

If the user inputs 2, BBMS proceeds to block 1307 and plays the system message "Please enter a 4-digit PIN for recording to a private message." BBMS then receives user input via the TUI at block 1309 for the private message PIN. If the PIN for recording to private messages is entered successfully 1311, BBMS stores the PIN for recording to private messages in the database, MDS at block 1313. BBMS then returns to the bulletin board menu at block 713. If the private message PIN is not entered successfully 1311, BBMS goes to error processing 1002. BBMS the returns to the main menu at block 1312.

Figure 14:
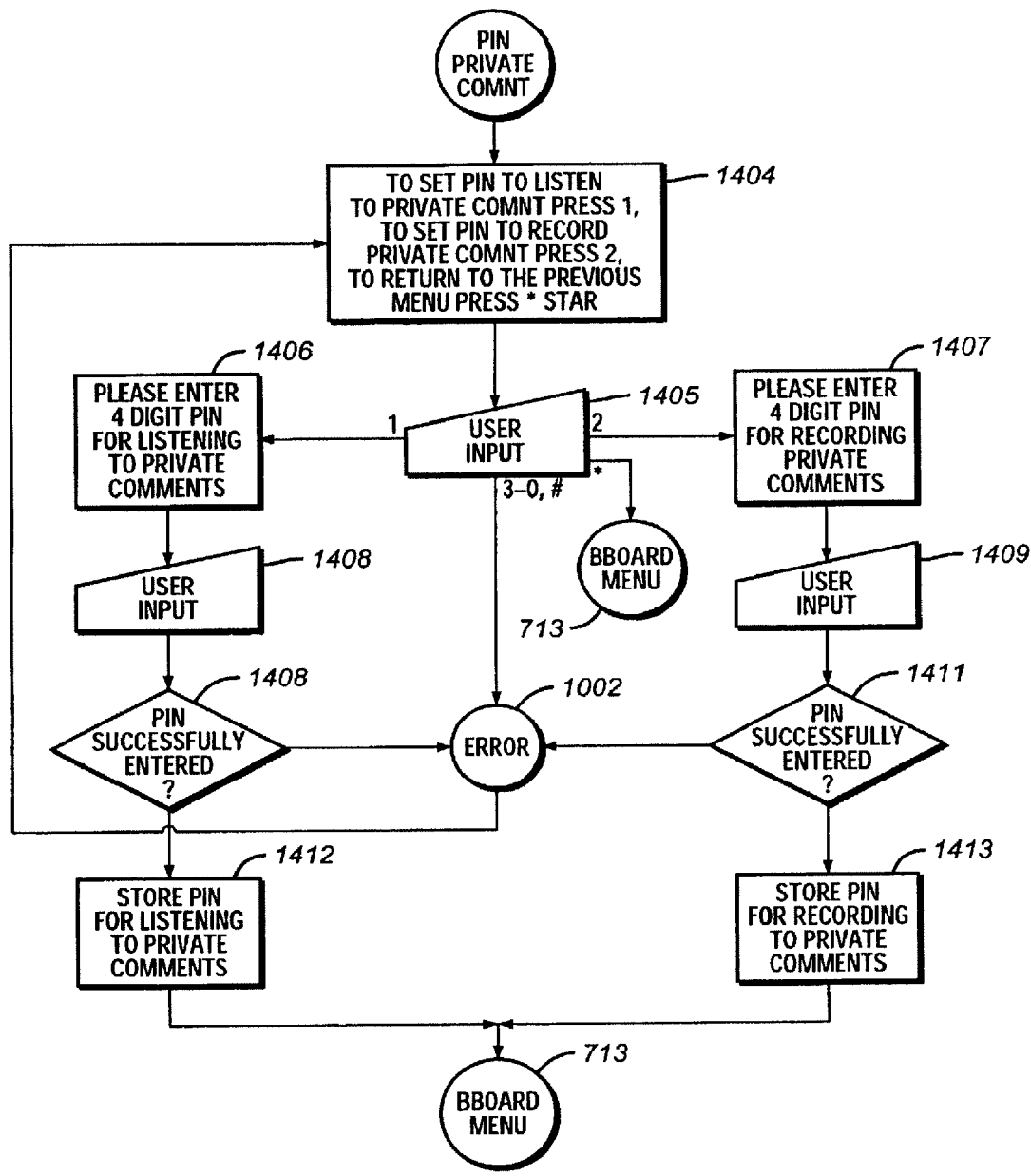
FIG. 14 illustrates an example of the functions performed by the BBMS function in setting up a PIN for listening to or recording private comments associated with one of a plurality of bulletin boards in the present example of the invention.

Turning now to FIG. 14, at 1404 BBMS function plays the system comment, "To set up a PIN to listen to private comments, press 1, To set a PIN to record a private comment, press 2, to return to the previous menu press *." At 1405 user input is accepted. If the user inputs 1, BBMS proceeds to block 1406 and plays the system comment "Please enter a 4-digit PIN for listening to a private comment." BBMS then receives user input via the TUI at block 1408 for the private comment PIN. If the PIN for listening to private comments is entered successfully 1410, BBMS stores the PIN for listening to private comments in the database, MDS at block 1412. If the private comment PIN is not entered successfully 1410, BBMS goes to error processing 1002. BBMS then returns to the main menu at block 1404. If the user inputs *, BBMS returns to BBoard menu 713. If the user inputs 3-0 or # BBMS proceeds to error processing 1002.

If the user inputs 2, BBMS proceeds to block 1407 and plays the system message "Please enter a 4-digit PIN for recording a private comment." BBMS then receives user input via the TUI at block 1409 for the private comment PIN. If the PIN for recording to private comments is entered successfully 1411, BBMS stores the PIN for recording to private comments in the database, MDS at block 1413. BBMS then returns to the bulletin board menu at block 713. If the private comments PIN is not entered successfully 1411, BBMS goes to error processing 1002. BBMS then returns to the main menu at block 1404.

Figure 15:
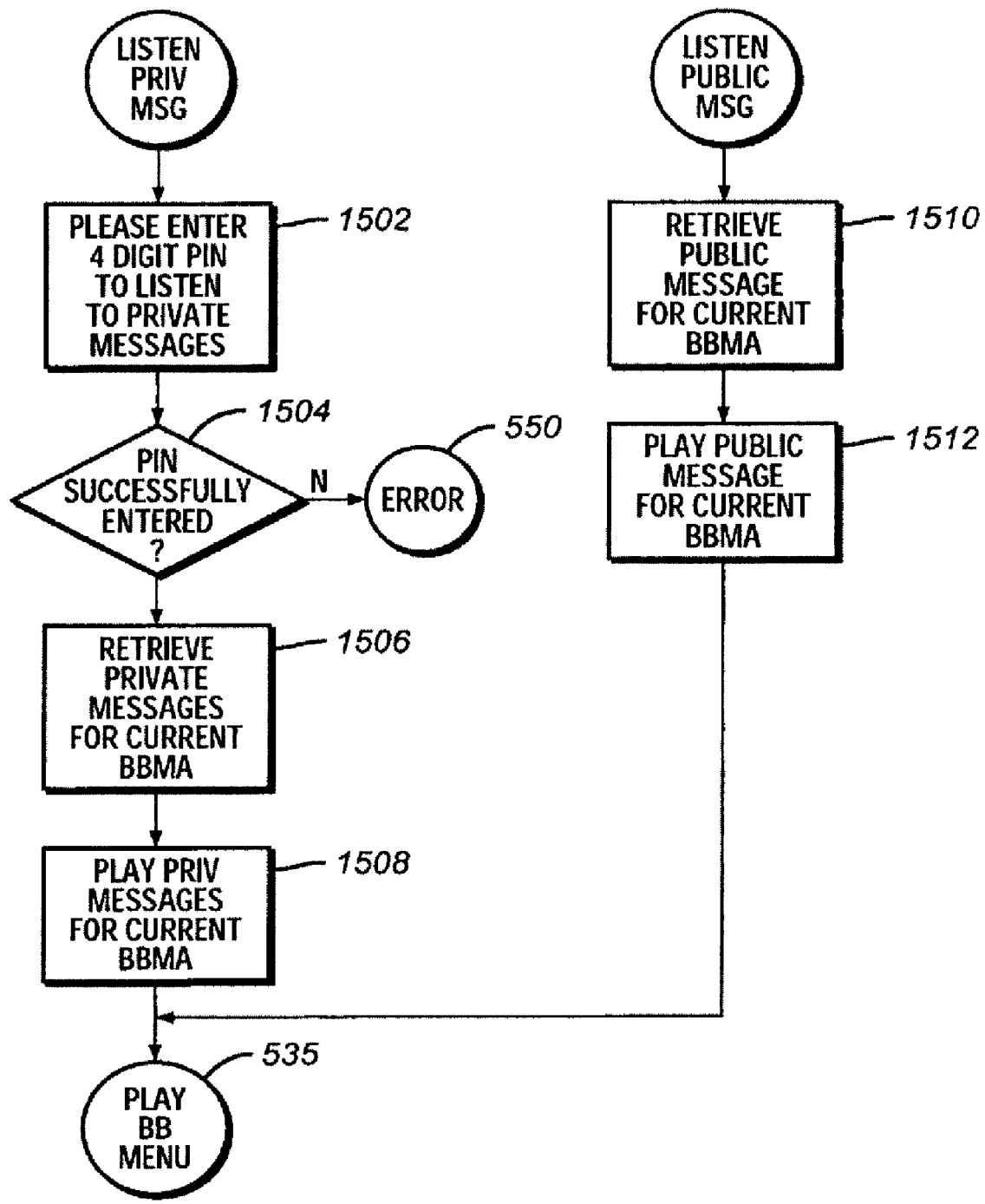
FIG. 15 illustrates an example of the functions performed by the BBMS function in processing to enable a caller to listen to a PIN restricted private message or a public message, in which a caller is prompted to enter a PIN to listen to private messages for one of a plurality of bulletin boards in the present example of the invention.

Turning now to FIG. 15, BBMS processing for listening to a private message is illustrated. At block 1502 BBMS plays a system message, "Please enter the 4-digit PIN to hear a private message" and receives user input from the TUI. At block 1504 BBMS determines if the PIN is successfully entered, using well known PIN processing. If the PIN is successfully entered, the BBM process proceeds to block 1506, where BBMS retrieves the private message(s) from the private message area for the selected BBM. At block 1508, BBMS plays the retrieved private messages to the user, using the TUI. The BBM message then proceeds to 535 where the user can hear the message again or select another option. If the PIN is not successfully entered, BBMS goes to error processing 550.

Figure 16:
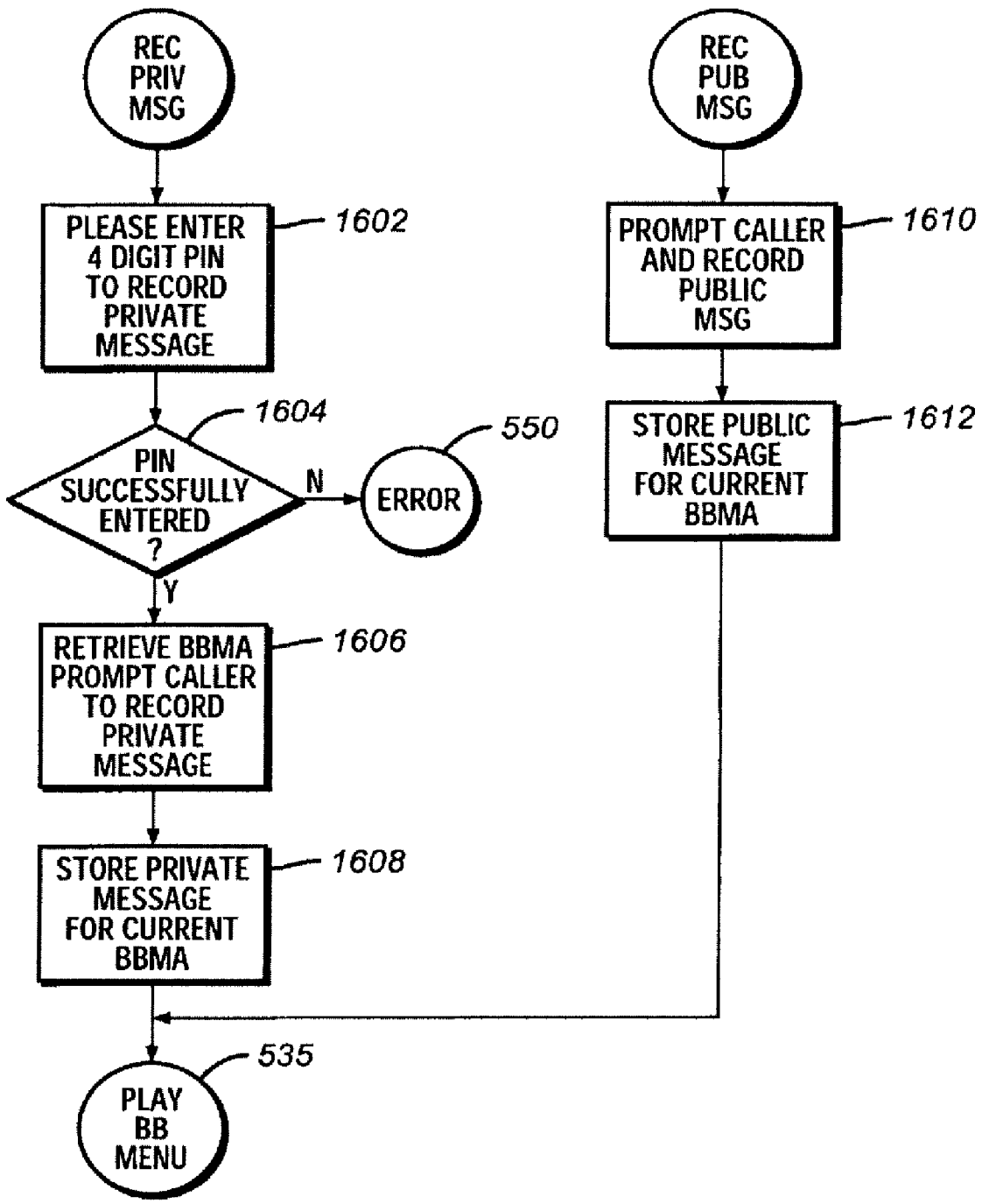
FIG. 16 illustrates an example of the functions performed by the BBMS function in processing to enable a caller to record a PIN restricted private message or a public message, in which a caller is prompted to enter a PIN to record a private message for one of a plurality of bulletin boards in the present example of the invention.

Turning now to FIG. 16, the BBM processing for recording a public or private message is illustrated. At block 1602 BBMS plays system message "Please enter the 4-digit PIN to record a private message." The BBM then receives input from the user via the TUI. At block 1604 BBMS determines if the 4-digit PIN was successfully entered using standard PIN processing. If the PIN is not entered correctly, BBMS proceeds to error processing 550. If the PIN is entered correctly, at block 1606 BBMS retrieves a database index to the private message section of the currently selected BBMA message area. The private messages area of the currently selected BBM message area is the repository for previously recorded private messages, if any. At block 1606 retrieves the BBMA index to the private message section of the currently selected BBMA private message area 404. BBMS prompts the user via the TUI, receives user input via the TUI, records the message spoken by the user and adds it to the other private messages for the currently selected BBM message area. BBMS then stores the newly recorded private message along with previously recorded private messages in the data base in the private message area for the currently selected BBM message area at block 1608. BBMS then returns to 535 to allow the user to select another option.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a computer readable medium, a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and public telephone networks represent examples of the state of the art. Such standards are periodically superseded by faster or more efficient equivalents having essentially the same functions. Accordingly, replacement standards and protocols having the same functions are considered equivalents.

What is claimed is:

1. A bulletin board messaging system service, comprising:
    enabling a caller to indicate a selected bulletin board from a plurality of bulletin boards associated with a subscriber telephone number;
    enabling the caller to indicate a selected public message option from a group consisting of a recording public message option and a listening to public messages option;
    enabling the caller to indicate, upon providing an applicable personal identification number, a selected private message option from a group consisting of a recording private message option and a listening to private messages option; and
    responsive to the caller successfully indicating the selected public message option:
        recording a voice message of the caller;
        storing the voice message in a tangible storage medium; and
        associating the voice message stored in the tangible storage medium with the selected bulletin board.

2. The service of claim 1, wherein a personal identification number applicable to the recording private message option differs from a personal identification number applicable to the listening to private messages option.

3. The service of claim 1, further comprising:
    enabling the caller to indicate, responsive to the storing of the voice message, a selected public comment option from a group consisting of a recording public comment option and a listening to public comments option; and
    enabling the caller to indicate, in response to the storing of the voice message and upon providing the applicable personal identification number, a selected private comment option from a group consisting of a recording private comment option and a listening to private comments option; and
    responsive to the caller successfully indicating either the recording public comment or the recording private comment option:
        recording a voice comment of the caller;
        storing the voice comment as recorded to a tangible storage medium; and
        associating the voice comment as recorded with the selected bulletin board wherein the voice comment is responsive to the voice message.

4. The service of claim 3, wherein the personal identification numbers applicable to the private message options are different than the personal identification numbers applicable to the private comment options.

5. The service of claim 2, wherein a personal identification number applicable to the recording private comment option differs from a personal identification number applicable to the listening to private comments option.

6. A tangible computer-readable storage medium including embedded instructions, executable by a processor, for:
    enabling a caller to indicate a selected bulletin board associated with a subscriber telephone number;
    enabling a caller to select any of a set of options for recording and listening to public messages associated with the selected bulletin board;
    enabling a caller to select any of a set of options for recording and listening to public comments, wherein a public comment is responsive to a public message;
    implementing personal identification number code access for a set of options for recording and listening to private messages;
    enabling a caller, upon presenting an applicable personal identification number, to select an option for recording a private message;
    enabling a caller, upon presenting an applicable personal identification number, to select an option for listening to a private message;
    enabling a caller, upon presenting an applicable personal identification number, to select an option for recording a private comment responsive to a recorded private message;
    enabling a caller, upon presenting an applicable personal identification number, to select an option for listening to a private comment; and
    recording messages to a tangible storage medium responsive to the caller successfully selecting any option for recording.

7. The computer readable medium of claim 6, wherein the personal identification numbers applicable to the recording private message option, the listening to private message option, the recording private comment option, and the listening to private comment option are all different.

8. The computer readable medium of claim 6, wherein the personal identification numbers applicable to the recording private message option and the listening to private comment option are the same.

9. The computer readable medium of claim 8, wherein the personal identification numbers applicable to the listening to private message option and recording private comment option are the same.

10. The computer readable medium of claim 9, wherein the personal identification numbers applicable to the recording private message option and the listening to private message option are different.

11. A bulletin board messaging system service, comprising:
    associating a plurality of bulletin boards with a subscriber telephone number and enabling caller access to a bulletin board message via the subscriber telephone number;
    enabling a caller to indicate a selected bulletin board responsive to the bulletin board message;
    enabling the caller to select from a set of public options for recording and listening to public messages associated with the selected bulletin board;
    selectively enabling a first set of authorized callers to select a record-private-message-option;
    selectively enabling a second set of authorized callers to select a listen-to-private-messages option; and
    responsive to the caller successfully selecting an option for recording a public or private message, recording a caller message, storing the caller message, and associating the caller message with the selected bulletin board.

12. The service of claim 11, further comprising:
    enabling the caller to select from a set of public options for recording and listening to public comments responsive to the public messages;
    selectively enabling a third set of authorized callers to select a record-private-comment-option responsive to the private message; and
    selectively enabling a fourth set of authorized callers to select a listen-to-private-messages option.

\* \* \* \* \*

UNITED STATES PATENT AND TRADEMARK OFFICE
CERTIFICATE OF CORRECTION

| | | |
|---|---|---|
| PATENT NO. | : 8,098,800 B2 | Page 1 of 1 |
| APPLICATION NO. | : 11/969074 | |
| DATED | : January 17, 2012 | |
| INVENTOR(S) | : Kathy Goode Piatt et al. | |

It is certified that error appears in the above-identified patent and that said Letters Patent is hereby corrected as shown below:

On the Title Page

Please correct the spelling of the Assignee:

AT&T ~~Intellecutal~~ Intellectual Property I, L.P.

Signed and Sealed this

Twenty-first Day of February, 2012

David J. Kappos
*Director of the United States Patent and Trademark Office*